United States Patent
Meng (10) Patent No.: US 10,578,908 B2
(45) Date of Patent: Mar. 3, 2020

(54) LIQUID CRYSTAL DISPLAY PANEL (71) Applicant: Shenzhen China Star Optoelectronics Technology Co., Ltd., Shenzhen (CN)

(72) Inventor: Xiaolong Meng, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/518,697

(22) PCT Filed: Mar. 1, 2017

(86) PCT No.: PCT/CN2017/075343
§ 371 (c)(1),
(2) Date: Apr. 12, 2017

(87) PCT Pub. No.: WO2018/148991
PCT Pub. Date: Aug. 23, 2018

(65) Prior Publication Data
US 2019/0086718 A1    Mar. 21, 2019

(30) Foreign Application Priority Data
Feb. 15, 2017    (CN) .......................... 2017 1 0081895

(51) Int. Cl.
*G02F 1/1335* (2006.01)
*G02F 1/1339* (2006.01)
(Continued)

(52) U.S. Cl.
CPC ...... *G02F 1/133514* (2013.01); *G02F 1/1339* (2013.01); *G02F 1/1341* (2013.01);
(Continued)

(58) Field of Classification Search
CPC ......... G02F 1/133514; G02F 1/133512; G02F 1/1339; G02F 1/136286; G02F 1/13394; G02F 2001/133354
See application file for complete search history.

(56) References Cited

U.S. PATENT DOCUMENTS

| 5,418,633 A | 5/1995 | Samsung Electronics Co., Ltd. |
| 2010/0079718 A1* | 4/2010 | Sekiya .............. G02F 1/133512 349/153 |

(Continued)

FOREIGN PATENT DOCUMENTS

| CN | 103576390 | 2/2014 |
| CN | 103676337 | 3/2014 |

(Continued)

OTHER PUBLICATIONS

The International Search Report and Written Opinion for related International Application No. PCT/CN2017/075343; dated Nov. 16, 2017; (12 pages).

(Continued)

Primary Examiner — Hoan C Nguyen (57) ABSTRACT

A liquid crystal display panel is disclosed. The liquid crystal display panel includes a color filter substrate, an array substrate, and a liquid crystal layer. A surface of the array substrate facing the color filter substrate is divided into an active area and a non-active area. The non-active area includes a second region where no metal wiring is arranged. The surface of the array substrate facing the color filter substrate is non-flat in the second region. According to the present disclosure, a sealing strength between the color filter substrate and the array substrate can be improved, and pollution on a liquid crystal layer of the liquid crystal display panel can be avoided.

12 Claims, 9 Drawing Sheets

(51) Int. Cl.
 G02F 1/1362 (2006.01)
 G02F 1/1345 (2006.01)
 G02F 1/1341 (2006.01)
 G02F 1/1333 (2006.01)

(52) U.S. Cl.
 CPC .......... G02F 1/1345 (2013.01); G02F 1/1362 (2013.01); G02F 1/13392 (2013.01); G02F 1/13394 (2013.01); G02F 1/133512 (2013.01); G02F 1/136286 (2013.01); G02F 1/13452 (2013.01); G02F 1/13458 (2013.01); G02F 1/133504 (2013.01); G02F 1/133516 (2013.01); G02F 1/133526 (2013.01); G02F 2001/13396 (2013.01); G02F 2001/13456 (2013.01); G02F 2001/133388 (2013.01); G02F 2202/023 (2013.01)

(56) References Cited

U.S. PATENT DOCUMENTS

| | | | | |
|---|---|---|---|---|
| 2012/0154732 A1* | 6/2012 | Morita | .................. | G02F 1/1339 349/143 |
| 2013/0271704 A1* | 10/2013 | Zhao | .................... | G02F 1/1339 349/97 |
| 2015/0029432 A1* | 1/2015 | Ishikawa | ............. | G02F 1/13394 349/43 |
| 2015/0346556 A1* | 12/2015 | Hirota | .................. | G02F 1/1339 349/43 |
| 2016/0147111 A1 | 5/2016 | Innolux Corporation | | |

FOREIGN PATENT DOCUMENTS

| | | | |
|---|---|---|---|
| CN | 104007584 | * | 8/2014 |
| CN | 104656293 | | 5/2015 |
| CN | 104765203 | | 7/2015 |
| CN | 106019728 | | 10/2016 |
| CN | 106249487 | | 12/2016 |
| JP | 2009175483 A | * | 8/2009 |

OTHER PUBLICATIONS

Chinese Office Action with Search Report for related Chinese Application No. CN201710081895.X; dated Dec. 14, 2017; (6 pages).

* cited by examiner

Fig. 1

Prior Art

Fig. 2

Prior Art

Fig. 3

Prior Art

LIQUID CRYSTAL DISPLAY PANEL

CROSS REFERENCE TO RELATED APPLICATION

The present application claims priority of Chinese patent application CN201710081895.X, entitled "Liquid Crystal Display Panel" and filed on Feb. 15, 2017, the entirety of which is incorporated herein by reference.

FIELD OF THE INVENTION

The present disclosure relates to the technical field of liquid crystal display, and particularly to a liquid crystal display panel.

BACKGROUND OF THE INVENTION

At present, liquid crystal display technology has been widely used in various kinds of electronic products. The narrow frame technology has become a conventional technical means in the liquid crystal display field. Since the frame is narrow, an image displayed by a liquid crystal display panel is more complete, and a utilization ratio of a display screen can be improved. When an electronic product with a narrow frame liquid crystal display panel is used, such as TV, mobile phone, and tablet personal computer, a larger visual field can be obtained, and a visual experience of a user can be significantly improved.

However, if the frame of a display panel becomes narrower, a coating region of a sealant will become even narrower. Here, the coating region of the sealant comprises a non-active area of a color filter substrate and a non-active area of an array substrate. If the coating region of the sealant gets narrower, a sealing strength thereof on the color filter substrate and the array substrate of the liquid crystal display panel will become smaller. As a result, a liquid crystal cell cannot be sealed tightly. Gas would enter into the liquid crystal cell more easily, or liquid crystal would leak from the liquid crystal cell more easily. In order to solve the aforesaid technical problem, in a step of manufacturing the liquid crystal cell in the prior art, the sealant is also coated on a surface of a black matrix of the color filter substrate facing the array substrate. In addition, the sealant is doped with an interstitial so as to maintain a thickness of the liquid crystal cell.

Since more than 90 percent of ultraviolet (UV) which is used for solidifying the sealant would be shaded by the black matrix, the ultraviolet is generally arranged to irradiate the sealant from the array substrate in the industry. However, since the non-active area of the array substrate is provided with a metal wiring for signal transmission, the ultraviolet will be shaded by the metal wiring when it irradiates the sealant from the array substrate, and the sealant coated on the color filter substrate in a projection region of the metal wiring cannot be irradiated by the ultraviolet. As a result, during a solidification procedure of the sealant, the ultraviolet directly irradiates the sealant outside the projection region of the metal wiring, and this part of sealant can be solidified fully; while the ultraviolet cannot irradiate the sealant inside the projection region of the metal wiring, and this part of sealant cannot be solidified fully. Consequently, on the one hand, a liquid crystal layer of the liquid crystal display panel would easily be polluted by the non-fully solidified sealant, and on the other hand, a sealing strength between the color filter substrate and the array substrate would be reduced.

SUMMARY OF THE INVENTION

The technical problem to be solved by the present disclosure will be stated below. During a solidification procedure of a sealant in the prior art, ultraviolet would be shaded by a metal wiring that is arranged in a non-active area of an array substrate, and the sealant coated on a color filter substrate in a projection region of the metal wiring cannot be irradiated by the ultraviolet. As a result, this part of sealant cannot be solidified fully. Consequently, on the one hand, a liquid crystal layer of a liquid crystal display panel would easily be polluted by the non-fully solidified sealant, and on the other hand, a sealing strength between the color filter substrate and the array substrate would be reduced.

In order to solve the aforesaid technical problem, the present disclosure provides a liquid crystal display panel, which comprises: a color filter substrate, an array substrate, and a liquid crystal layer that is arranged between the color filter substrate and the array substrate, wherein the array substrate is divided into an active area and a non-active area, and the non-active area comprises a first region where a metal wiring of the array substrate is arranged and a second region where no metal wiring is arranged; the array substrate comprises a transparent refraction layer that is formed next to a metal layer where the metal wiring is arranged; the metal layer comprises a first lower surface disposed close to the color filter substrate, and a first upper surface opposite to the first lower surface; wherein the transparent refraction layer is an insulation layer that is formed next to the metal layer where the metal wiring is arranged; the transparent refraction layer comprises a second lower surface disposed close to the color filter substrate, and a second upper surface opposite to the second lower surface; the first lower surface is flush with the second lower surface, and the first upper surface is flush with the second upper surface; and wherein the second lower surface is provided with grooves and/or protrusions in the second region and between two adjacent metal wirings, such that a surface of the array substrate facing the color filter substrate is not a planar surface in the second region.

Preferably, the array substrate comprises a plurality of transparent layers; and among the plurality of transparent layers, at least one selected transparent layer is provided with grooves and/or protrusions in the second region so that the surface of the array substrate facing the color filter substrate is non-flat in the second region.

Preferably, the at least one selected transparent layer is one or more selected from a group consisting of a flat layer, an isolating layer, and a transparent electrode layer.

Preferably, the array substrate comprises a transparent refraction layer that is formed on a metal layer where the metal wiring is arranged; and a surface of the transparent refraction layer facing the color filter substrate is non-flat in the second region.

Preferably, the surface of the transparent refraction layer facing the color filter substrate is provided with grooves and/or protrusions in the second region.

Preferably, the transparent refraction layer is an insulation layer that is formed on the metal layer where the metal wiring is arranged; and a surface of the insulation layer facing the color filter substrate is provided with grooves and/or protrusions in the second region.

Preferably, the insulation layer is made of silicon nitride or silicon oxide.

Preferably, the transparent refraction layer comprises a plurality of insulation layers that are formed on the metal layer where the metal wiring is arranged; and the grooves and/or protrusions are formed by the plurality of insulation layers in a superposition manner.

Preferably, the insulation layers are made of silicon nitride or silicon oxide.

Preferably, the color filter substrate and the array substrate are adhered to each other through a sealant;

the sealant is coated on the surface of the array substrate facing the color filter substrate in the non-active area, a surface of the color filter substrate facing the array substrate in the non-active area, and a surface of a black matrix of the color filter substrate facing the array substrate; and the sealant that is coated on the surface of the black matrix facing the array substrate is doped with an interstitial.

Compared with the prior art, one embodiment or a plurality of embodiments according to the present disclosure may have the following advantages or beneficial effects.

In the prior art, since the ultraviolet would be shaded by a metal wiring that is arranged in the non-active area of the array substrate, the sealant that is coated on a projection region of the metal wiring of the color filter substrate cannot be irradiated by the ultraviolet, and this part of sealant cannot be solidified fully. The liquid crystal display panel according to the embodiment of the present disclosure aims to solve the aforesaid technical problem. In the liquid crystal display panel according to the embodiment of the present disclosure, since the surface of the array substrate facing the color filter substrate is non-flat in the second region of the non-active area, the ultraviolet which irradiates the non-flat surface can be refracted. The refracted light can irradiate the sealant in the projection region of the metal wiring, and thus this part of sealant can be solidified fully. Therefore, according to the present disclosure, the phenomena in the prior art, i.e., a liquid crystal layer being polluted by the non-fully solidified sealant, and a low sealing strength between the color filter substrate and the array substrate, can be eliminated. That is, according to the present disclosure, a purity of the liquid crystal layer in the liquid crystal display panel can be improved, and the sealing strength between the color filter substrate and the array substrate can be increased.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Figure 1:
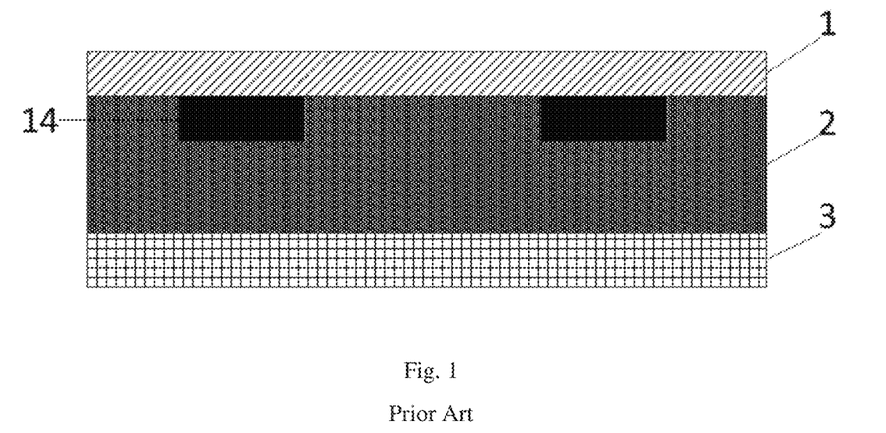
FIG. 1 is a sectional view of an active area of a liquid crystal display panel in the prior art.

FIG. 1 is a sectional view of an active area of a liquid crystal display panel in the prior art. As shown in FIG. 1, the liquid crystal display panel in the prior art comprises a color filter substrate 1, an array substrate 3, and a liquid crystal layer 2 that is arranged between the color filter substrate 1 and the array substrate 3. The color filter substrate 1 comprises a black matrix 14.

Figure 2:
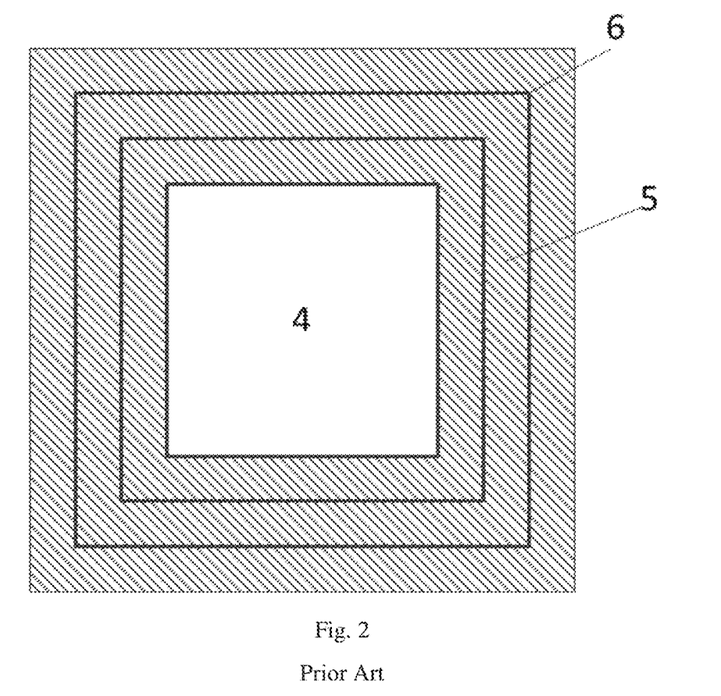
FIG. 2 schematically shows a structure of an array substrate of a liquid crystal display panel in the prior art.

FIG. 2 schematically shows a structure of an array substrate 3 of a liquid crystal display panel in the prior art. As shown in FIG. 2, the array substrate 3 is divided into an active area 4 and a non-active area 5. The non-active area 5 is provided with a metal wiring 6 for transmitting signal to components in the active area 4.

Figure 3:
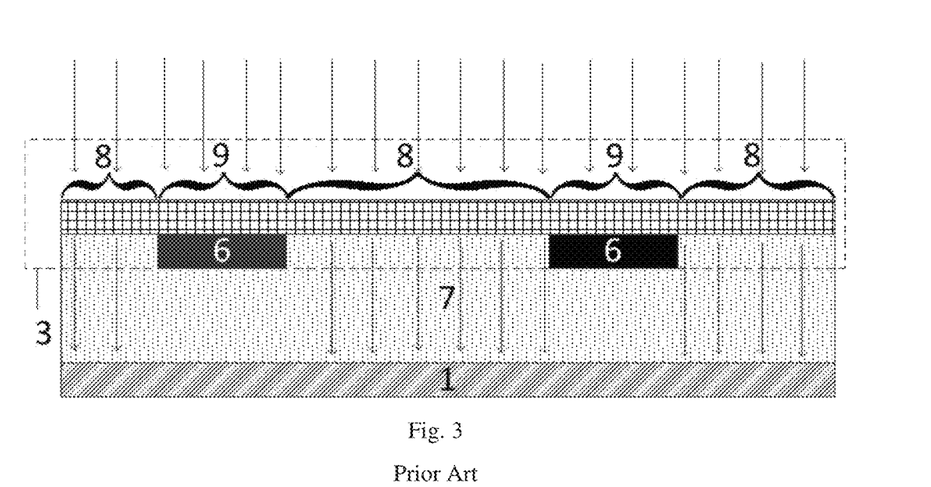
FIG. 3 is a sectional view of a non-active area of a liquid crystal display panel in the prior art.

FIG. 3 is a sectional view of a non-active area 5 of a liquid crystal display panel in the prior art. As shown in FIG. 3, the non-active area 5 is divided into a first region 9 and a second region 8. The peripheral metal wiring 6 is arranged in the first region 9 of the array substrate 3, while the second region 8 is not provided with the metal wiring 6. It should be noted that, the first region 9 and the second region 8 are both non-continuous regions.

In the prior art, during a solidification procedure of a sealant 7 that is arranged between the array substrate 3 and the color filter substrate 1, ultraviolet will be shaded by the metal wiring 6 that is arranged in the first region 9 of the array substrate 3 when it irradiates the sealant 7 from the array substrate 3 (as shown by arrows in FIG. 3), and thus the sealant 7 in a projection region of the metal wiring 6 cannot be irradiated. As a result, this part of sealant 7 cannot be fully solidified. Consequently, on the one hand, the liquid crystal layer 2 of the liquid crystal display panel would easily be polluted by the non-fully solidified sealant 7, and on the other hand, a sealing strength between the color filter substrate 1 and the array substrate 3 would be reduced.

Embodiment 1

In order to solve the aforesaid technical problem in the prior art, the embodiment of the present disclosure provides a liquid crystal display panel.

Figure 4:
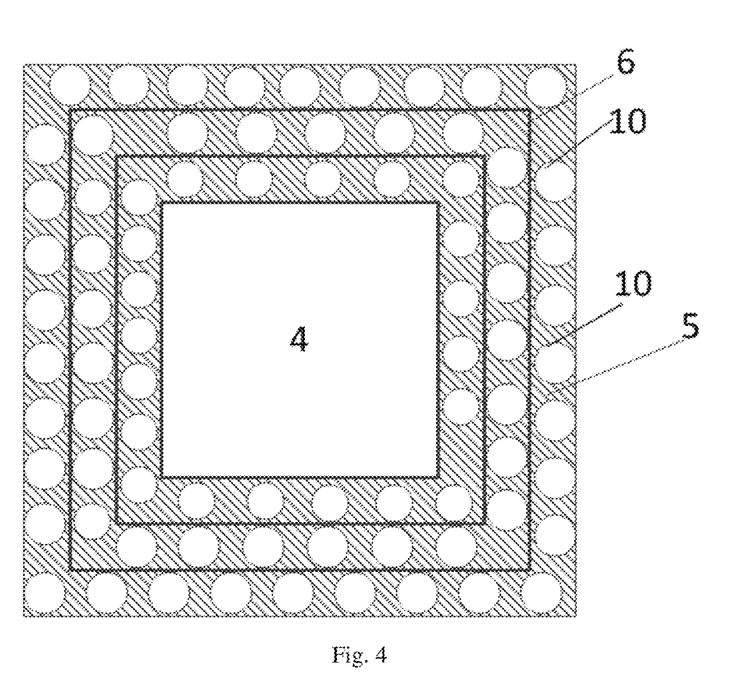
FIG. 4 schematically shows a structure of an array substrate of a liquid crystal display panel according to one embodiment of the present disclosure.
Figure 5:
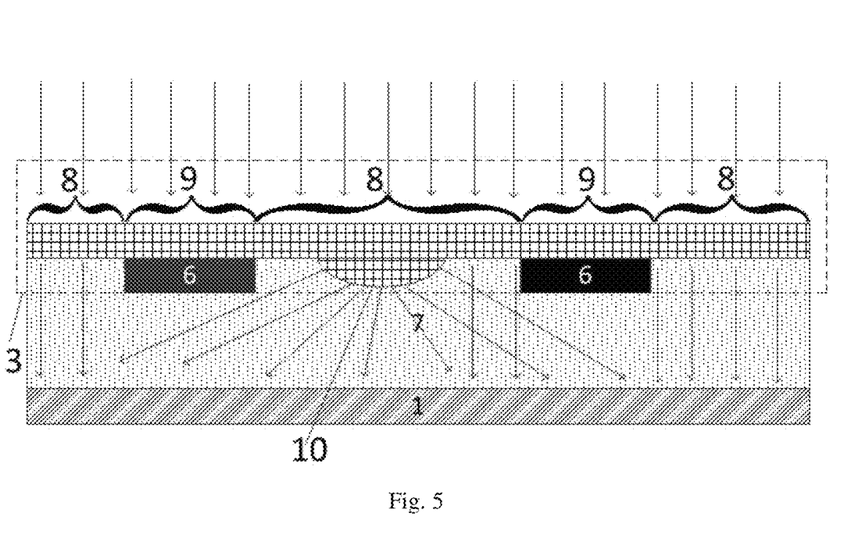
FIG. 5 is a sectional view of a first non-active area of a liquid crystal display panel according to one embodiment of the present disclosure.

FIG. 4 schematically shows a structure of an array substrate of a liquid crystal display panel according to one embodiment of the present disclosure. FIG. 5 is a sectional view of a first non-active area of a liquid crystal display panel according to one embodiment of the present disclosure.

As shown in FIGS. 4 and 5, according to the present embodiment, the liquid crystal display panel comprises a color filter substrate 1, an array substrate 3, and a liquid crystal layer that is arranged between the color filter substrate 1 and the array substrate 3. The array substrate 3 is divided into an active area 4 and a non-active area 5. The non-active area 5 is provided with a metal wiring 6 for transmitting signal to components in the active area 4. In addition, the non-active area 5 is divided into a first region 9 and a second region 8.

The metal wiring 6 is arranged in the first region 9, while the second region 8 is not provided with the metal wiring 6. Specifically, the surface of the array substrate 3 facing the color filter substrate 1 is non-flat in the second region 8.

According to the present embodiment, since the surface of the array substrate 3 facing the color filter substrate 1 is non-flat in the second region 8, the ultraviolet which irradiates a non-flat surface 10 of the second region 8 can be refracted when it irradiates a sealant from the array substrate 3. The refracted light can irradiate the sealant 7 coated on the color filter substrate in a projection region of the metal wiring 6, and thus this part of sealant 7 can be solidified fully.

Based on the above analysis, according to the present embodiment, the ultraviolet can be refracted by the non-flat surface 10, so that the sealant 7 in the projection region of the metal wiring 6 can be fully solidified. Therefore, according to the present embodiment, the phenomena in the prior art, i.e., a liquid crystal layer being polluted by the non-fully solidified sealant 7, and a low sealing strength between the color filter substrate 1 and the array substrate 3, can be eliminated. That is, according to the present embodiment, a purity of the liquid crystal layer in the liquid crystal display panel can be improved, and the sealing strength between the color filter substrate 1 and the array substrate 3 can be increased.

The following embodiment 2 and embodiment 3 are preferred embodiments for forming the aforesaid non-flat surface 10.

Embodiment 2

Figure 6:
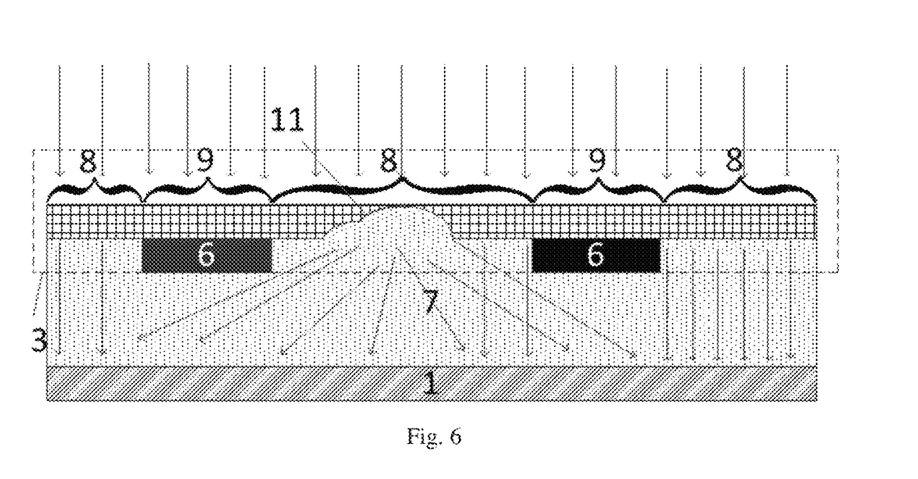
FIG. 6 is a sectional view of a second non-active area of a liquid crystal display panel according to one embodiment of the present disclosure.

FIG. 6 is a sectional view of a second non-active area of a liquid crystal display panel according to one embodiment of the present disclosure. As shown in FIG. 6, the array substrate 3 comprises a plurality of transparent layers, which comprise at least one selected transparent layer. Here, the selected transparent layer can be any transparent layer of the array substrate 3, as long as the non-flat surface 10 as stated in embodiment 1 can be formed through proper treatment. The present embodiment is not limited by this. Specifically, the selected transparent layer is preferably a flat layer, an isolating layer, or a transparent electrode layer of the array substrate 3.

At least one selected transparent layer is provided with grooves 11 in the second region 8. Here, the grooves 11 can be formed by one selected transparent layer, and can also be formed by a plurality of selected transparent layers in a superposition manner According to the present embodiment, a quantity of the grooves 11 is not defined. According to the present embodiment, the grooves 11 are arranged so that the surface of the array substrate 3 facing the color filter substrate 1 is non-flat in the second region 8 and the aforesaid non-flat surface 10 can be formed.

Figure 7:
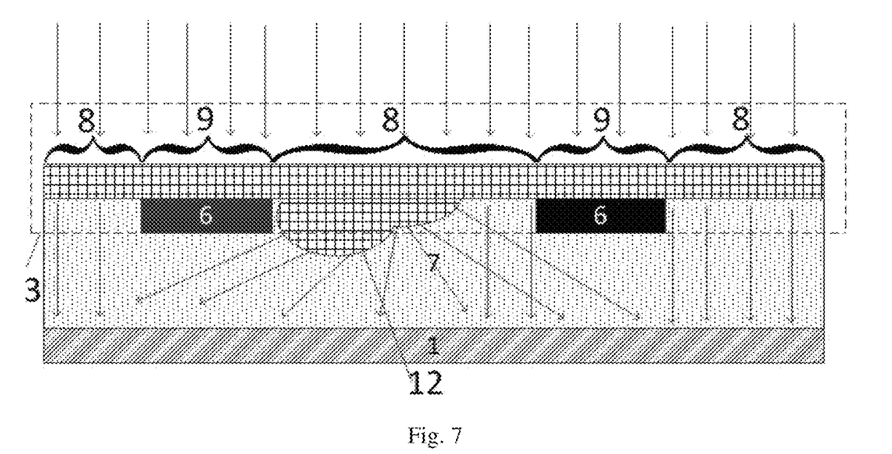
FIG. 7 is a sectional view of a third non-active area of a liquid crystal display panel according to one embodiment of the present disclosure.

FIG. 7 is a sectional view of a third non-active area of a liquid crystal display panel according to one embodiment of the present disclosure. As shown in FIG. 7, the array substrate 3 comprises a plurality of transparent layers, which comprise at least one selected transparent layer. Here, the selected transparent layer can be any transparent layer of the array substrate 3, as long as the non-flat surface 10 as stated in embodiment 1 can be formed through proper treatment. The present embodiment is not limited by this. Specifically, the selected transparent layer is preferably a flat layer, an isolating layer, or a transparent electrode layer of the array substrate 3.

At least one selected transparent layer is provided with protrusions 12 in the second region 8. Here, the protrusions 12 can be formed by one selected transparent layer, and can also be formed by a plurality of selected transparent layers in a superposition manner According to the present embodiment, a quantity of the protrusions 12 is not defined. According to the present embodiment, the protrusions 12 are arranged so that the surface of the array substrate 3 facing the color filter substrate 1 is non-flat in the second region 8 and the aforesaid non-flat surface 10 can be formed.

Figure 8:
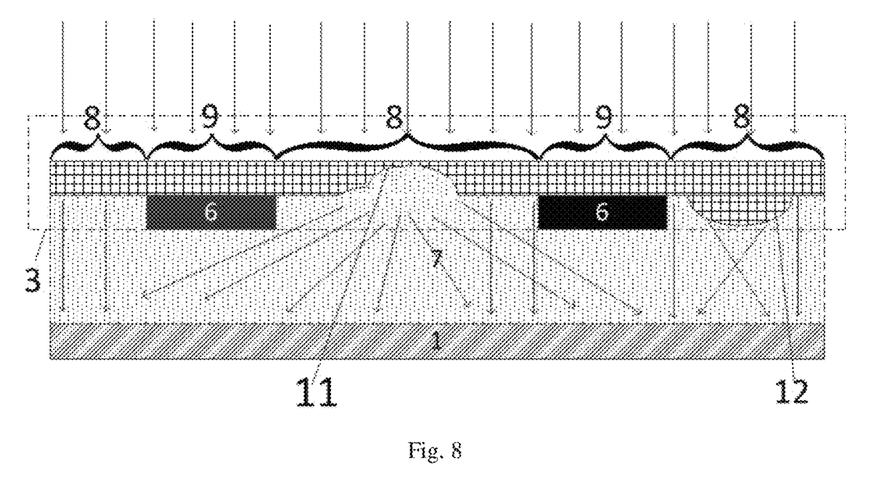
FIG. 8 is a sectional view of a fourth non-active area of a liquid crystal display panel according to one embodiment of the present disclosure.

FIG. 8 is a sectional view of a fourth non-active area of a liquid crystal display panel according to one embodiment of the present disclosure. As shown in FIG. 8, the array substrate 3 comprises a plurality of transparent layers, which comprise at least one selected transparent layer. Here, the selected transparent layer can be any transparent layer of the array substrate 3, as long as the non-flat surface 10 as stated in embodiment 1 can be formed through proper treatment. The present embodiment is not limited by this. Specifically, the selected transparent layer is preferably a flat layer, an isolating layer, or a transparent electrode layer of the array substrate 3.

At least one selected transparent layer is provided with grooves 11 and protrusions 12 in the second region 8. Here, the grooves 11 and the protrusions 12 can be formed by one selected transparent layer, and can also be formed by a plurality of selected transparent layers in a superposition manner According to the present embodiment, a quantity of the grooves 11 and the protrusions 12 is not defined. According to the present embodiment, the grooves 11 and the protrusions 12 are arranged so that the surface of the array substrate 3 facing the color filter substrate 1 is non-flat in the second region 8 and the aforesaid non-flat surface 10 can be formed.

According to the present embodiment, the non-flat surface 10 as stated in embodiment 1 can be formed by an inherent structure (i.e., the plurality of transparent layers) of the array substrate 3. It can be seen that, according to the present embodiment, no new layer is introduced. The aforesaid groove 11 and/or protrusions 12 can be formed based on the prior manufacturing technology together with a slight adjustment, and thus the non-flat surface 10 can be formed. According to the present embodiment, a thickness of a liquid crystal cell is not increased, which is beneficial to the flatness and compactness of a liquid crystal display product and is in accordance with a development trend of the liquid crystal display product.

Embodiment 3

According to the present embodiment, the non-flat surface 10 as stated in embodiment 1 is formed by a transparent refraction layer arranged on the array substrate additionally. Specifically, the array substrate comprises a transparent refraction layer that is formed next to a metal layer where the metal wiring is arranged. A surface of the transparent refraction layer facing the color filter substrate is non-flat in the second region. In particular, the surface of the transparent refraction layer facing the color filter substrate is provided with grooves and/or protrusions in the second region. Here, the transparent refraction layer can be formed by one insulation layer, and can also be formed by a plurality of insulation layers in a superposition manner.

Figure 9:
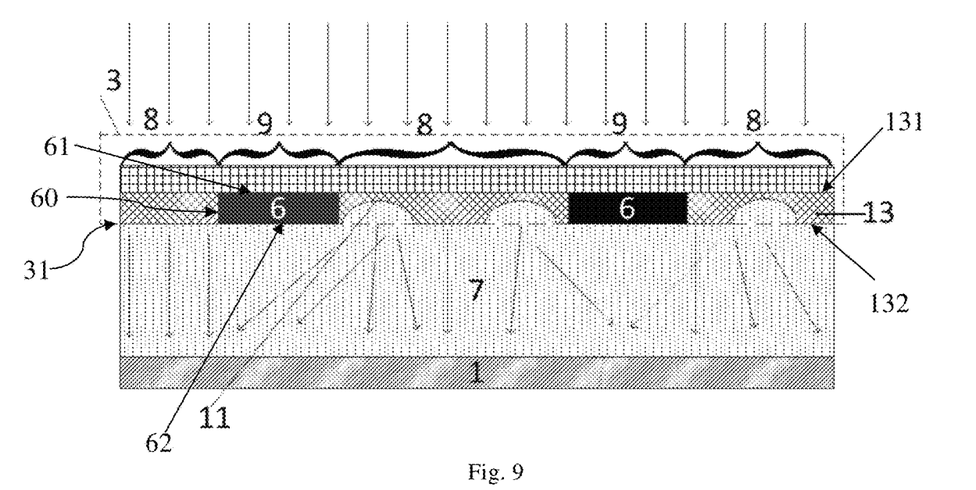
FIG. 9 is a sectional view of a fifth non-active area of a liquid crystal display panel according to one embodiment of the present disclosure.

Specifically, FIG. 9 is a sectional view of a fifth non-active area of a liquid crystal display panel according to one embodiment of the present disclosure. As shown in FIG. 9, the array substrate 3 comprises an insulation layer 13 (i.e., the aforesaid transparent refraction layer) that is formed next to a metal layer 60 where the metal wiring 6 is arranged. In particular, the insulation layer 13 is made of silicon nitride, silicon oxide, silicon oxynitride, alumina or other insulation material, and the present embodiment is not limited by this. The aforesaid materials each have a high light transmittance, which will facilitate the improvement of an aperture ratio of the array substrate.

The metal layer 60 comprises a first lower surface 62 disposed close to the color filter substrate 1, and a first upper surface 61 opposite to the first lower surface 62. The transparent refraction layer 13 comprises a second lower surface 132 disposed close to the color filter substrate 1, and a second upper surface 131 opposite to the second lower surface 132. The first lower surface 62 is flush with the second lower surface 132, and the first upper surface 61 is flush with the second upper surface 131. The second lower surface 132 of the insulation layer 13 facing the color filter substrate 1 is provided with grooves 11 in the second region 8 and between two adjacent metal wirings 6. According to the present embodiment, a quantity of the grooves 11 is not defined. According to the present embodiment, the grooves 11 are arranged so that the surface 31 of the array substrate 3 (i.e., a surface of the transparent refraction layer) facing the color filter substrate 1 is non-flat in the second region 8 and the aforesaid non-flat surface 10 can be formed.

Figure 10:
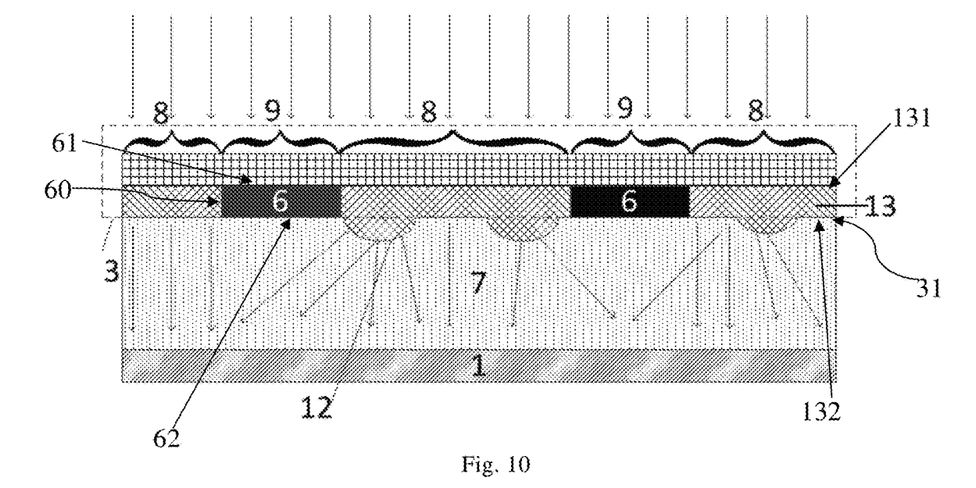
FIG. 10 is a sectional view of a sixth non-active area of a liquid crystal display panel according to one embodiment of the present disclosure.

FIG. 10 is a sectional view of a sixth non-active area of a liquid crystal display panel according to one embodiment of the present disclosure. As shown in FIG. 10, the array substrate 3 comprises an insulation layer 13 (i.e., the aforesaid transparent refraction layer) that is formed next to a metal layer 60 where the metal wiring 6 is arranged.

Specifically, the insulation layer 13 is made of silicon nitride, silicon oxide, silicon oxynitride, alumina or other insulation material, and the present embodiment is not limited by this. The aforesaid materials each have a high light transmittance, which will facilitate the improvement of an aperture ratio of the array substrate.

The metal layer 60 comprises a first lower surface 62 disposed close to the color filter substrate 1, and a first upper surface 61 opposite to the first lower surface 62. The transparent refraction layer 13 comprises a second lower surface 132 disposed close to the color filter substrate 1, and a second upper surface 131 opposite to the second lower surface 132. The first lower surface 62 is flush with the second lower surface 132, and the first upper surface 61 is flush with the second upper surface 131. The second lower surface 132 of the insulation layer 13 facing the color filter substrate 1 is provided with protrusions 12 in the second region 8 and between two adjacent metal wirings 6. According to the present embodiment, a quantity of the protrusions 12 is not defined. According to the present embodiment, the protrusions 12 are arranged so that the surface 31 of the array substrate 3 (i.e., a surface of the transparent refraction layer) facing the color filter substrate 1 is non-flat in the second region 8 and the aforesaid non-flat surface 10 can be formed.

Figure 11:
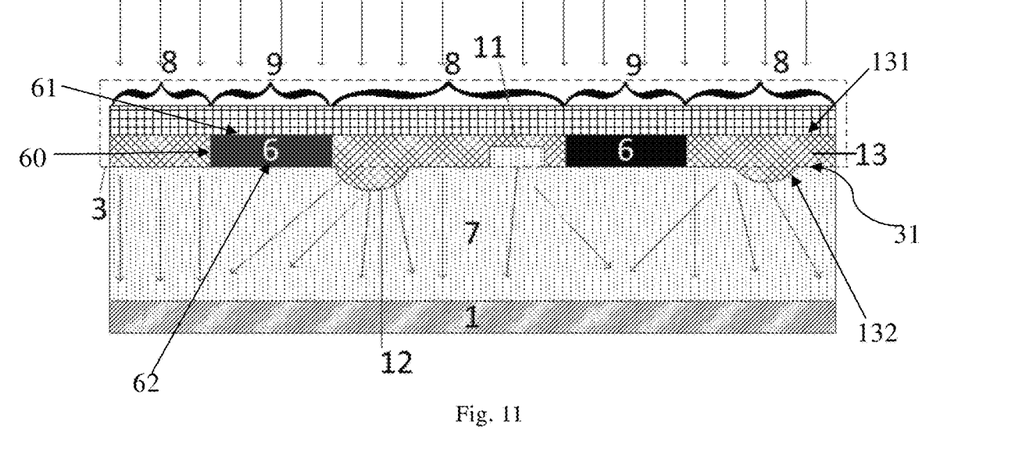
FIG. 11 is a sectional view of a seventh non-active area of a liquid crystal display panel according to one embodiment of the present disclosure.

FIG. 11 is a sectional view of a seventh non-active area of a liquid crystal display panel according to one embodiment of the present disclosure. As shown in FIG. 11, the array substrate 3 comprises an insulation layer 13 (i.e., the aforesaid transparent refraction layer) that is formed next to a metal layer 60 where the metal wiring 6 is arranged. Specifically, the insulation layer 13 is made of silicon nitride, silicon oxide, silicon oxynitride, alumina or other insulation material, and the present embodiment is not limited by this. The aforesaid materials each have a high light transmittance, which will facilitate the improvement of an aperture ratio of the array substrate.

The metal layer 60 comprises a first lower surface 62 disposed close to the color filter substrate 1, and a first upper surface 61 opposite to the first lower surface 62. The transparent refraction layer 13 comprises a second lower surface 132 disposed close to the color filter substrate 1, and a second upper surface 131 opposite to the second lower surface 132. The first lower surface 62 is flush with the second lower surface 132, and the first upper surface 61 is flush with the second upper surface 131. The second lower surface 132 of the insulation layer 13 facing the color filter substrate 1 is provided with grooves 11 and protrusions 12 in the second region 8 and between two adjacent metal wirings 6. According to the present embodiment, a quantity of the grooves 11 and protrusions 12 is not defined. According to the present embodiment, the grooves 11 and the protrusions 12 are arranged so that the surface 31 of the array substrate 3 (i.e., a surface of the transparent refraction layer) facing the color filter substrate 1 is non-flat in the second region 8 and the aforesaid non-flat surface 10 can be formed.

Figure 12:
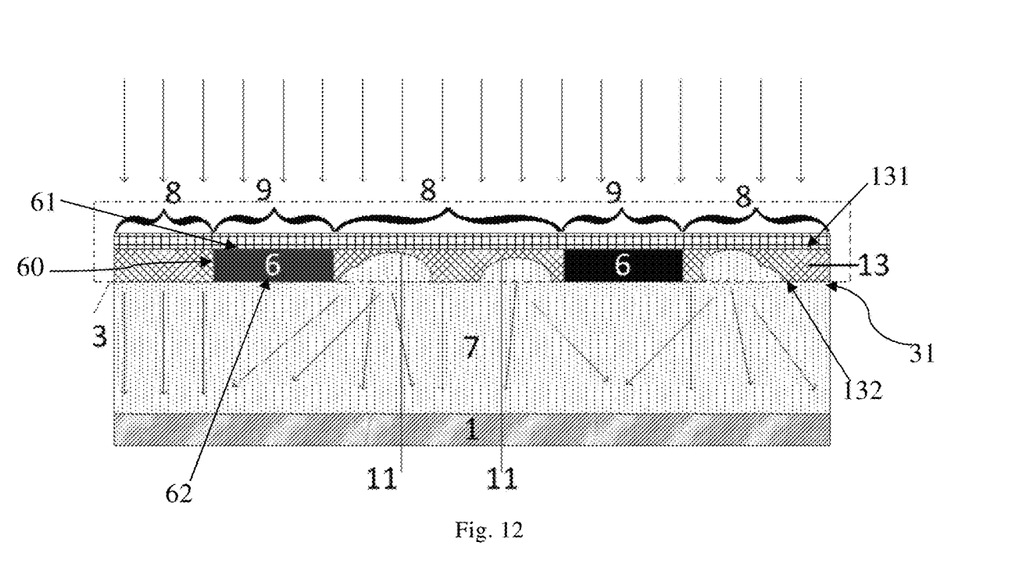
FIG. 12 is a sectional view of an eighth non-active area of a liquid crystal display panel according to one embodiment of the present disclosure.

FIG. 12 is a sectional view of an eighth non-active area of a liquid crystal display panel according to one embodiment of the present disclosure. As shown in FIG. 12, the transparent refraction layer comprises a plurality of insulation layers 13 that are formed next to the metal layer 60 where the metal wiring 6 is arranged. The plurality of insulation layers 13 constitute the transparent refraction layer. Specifically, each insulation layer 13 is made of silicon nitride, silicon oxide, silicon oxynitride, alumina or other insulation material, and the present embodiment is not limited by this. The aforesaid materials each have a high light transmittance, which will facilitate the improvement of an aperture ratio of the array substrate.

The metal layer 60 comprises a first lower surface 62 disposed close to the color filter substrate 1, and a first upper surface 61 opposite to the first lower surface 62. The transparent refraction layer comprises a second lower surface 132 disposed close to the color filter substrate 1, and a second upper surface 131 opposite to the second lower surface 132. The first lower surface 62 is flush with the second lower surface 132, and the first upper surface 61 is flush with the second upper surface 131. The insulation layers 13 which constitute the transparent refraction layer are superposed with one another one by one, whereby grooves 11 can be formed in the second region 8 and between two adjacent metal wirings 6 on the second lower surface 132 of the transparent refraction layer facing the color filter substrate 1. That is, the grooves 11 are formed by the plurality of insulation layers 13 which constitute the transparent refraction layer in a superposition manner According to the present embodiment, a quantity of the grooves 11 is not defined. According to the present embodiment, the grooves 11 are arranged so that the surface 31 of the array substrate 3 (i.e., a surface of the transparent refraction layer) facing the color filter substrate 1 is non-flat in the second region 8 and the aforesaid non-flat surface 10 can be formed.

Figure 13:
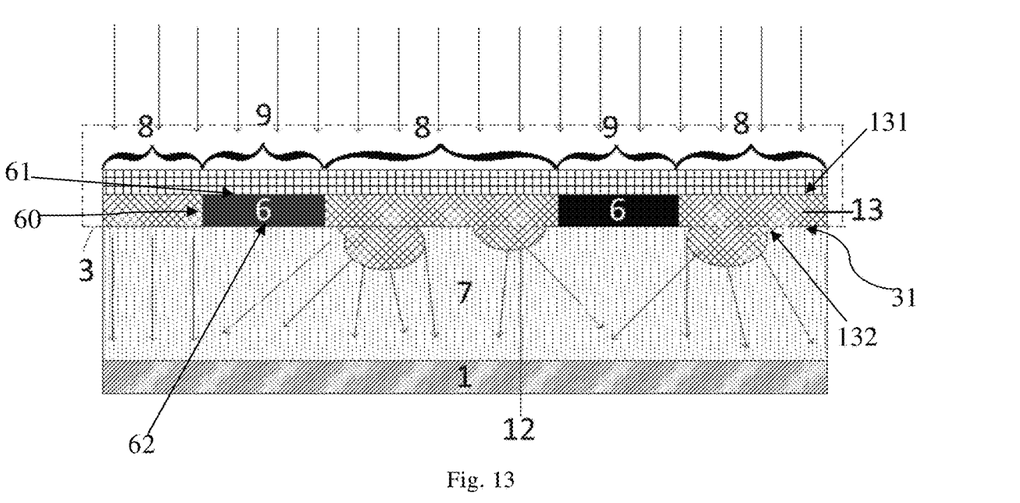
FIG. 13 is a sectional view of a ninth non-active area of a liquid crystal display panel according to one embodiment of the present disclosure.

FIG. 13 is a sectional view of a ninth non-active area of a liquid crystal display panel according to one embodiment of the present disclosure. As shown in FIG. 13, the transparent refraction layer comprises a plurality of insulation layers 13 that are formed next to the metal layer 60 where the metal wiring 6 is arranged. The plurality of insulation layers 13 constitute the transparent refraction layer. Specifically, each insulation layer 13 is made of silicon nitride, silicon oxide, silicon oxynitride, alumina or other insulation material, and the present embodiment is not limited by this. The aforesaid materials each have a high light transmittance, which will facilitate the improvement of an aperture ratio of the array substrate.

The metal layer 60 comprises a first lower surface 62 disposed close to the color filter substrate 1, and a first upper surface 61 opposite to the first lower surface 62. The transparent refraction layer comprises a second lower surface 132 disposed close to the color filter substrate 1, and a second upper surface 131 opposite to the second lower surface 132. The first lower surface 62 is flush with the second lower surface 132, and the first upper surface 61 is flush with the second upper surface 131. The insulation layers 13 which constitute the transparent refraction layer are superposed with one another one by one, whereby protrusions 12 can be formed in the second region 8 and between two adjacent metal wirings 6 on the second lower surface 132 of the transparent refraction layer facing the color filter substrate 1. That is, the protrusions 12 are formed by the plurality of insulation layers 13 which constitute the transparent refraction layer in a superposition manner According to the present embodiment, a quantity of the protrusions 12 is not defined. According to the present embodiment, the protrusions 12 are arranged so that the surface 31 of the array substrate 3 (i.e., a surface of the transparent refraction layer) facing the color filter substrate 1 is non-flat in the second region 8 and the aforesaid non-flat surface 10 can be formed.

Figure 14:
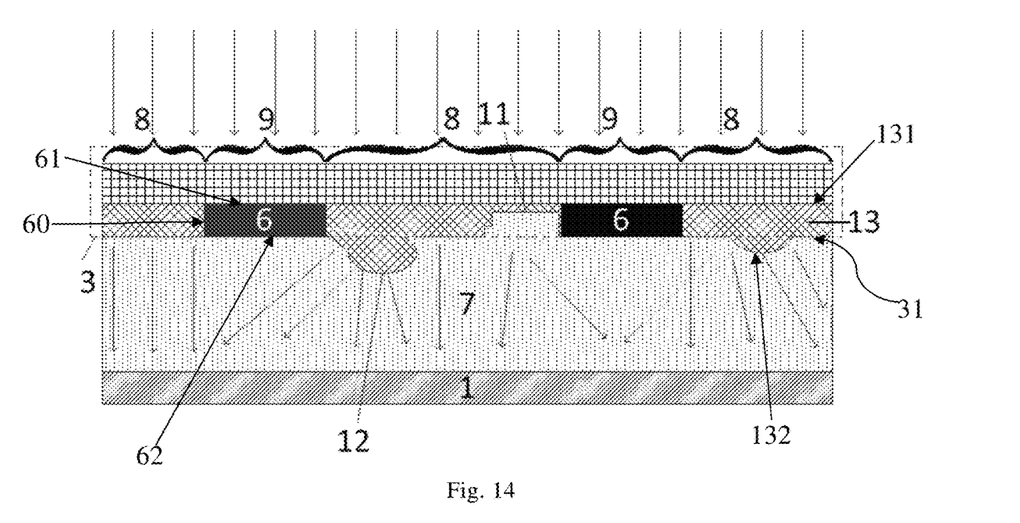
FIG. 14 is a sectional view of a tenth non-active area of a liquid crystal display panel according to one embodiment of the present disclosure.

FIG. 14 is a sectional view of a tenth non-active area of a liquid crystal display panel according to one embodiment of the present disclosure. As shown in FIG. 14, the transparent refraction layer comprises a plurality of insulation layers 13 that are formed next to the metal layer 60 where the metal wiring 6 is arranged. The plurality of insulation layers 13 constitute the transparent refraction layer. Specifically, each insulation layer 13 is made of silicon nitride, silicon oxide, silicon oxynitride, alumina or other insulation material, and the present embodiment is not limited by this. The aforesaid materials each have a high light transmittance, which will facilitate the improvement of an aperture ratio of the array substrate.

The metal layer 60 comprises a first lower surface 62 disposed close to the color filter substrate 1, and a first upper surface 61 opposite to the first lower surface 62. The transparent refraction layer comprises a second lower surface 132 disposed close to the color filter substrate 1, and a second upper surface 131 opposite to the second lower surface 132. The first lower surface 62 is flush with the second lower surface 132, and the first upper surface 61 is flush with the second upper surface 131. The insulation layers 13 which constitute the transparent refraction layer are superposed with one another one by one, whereby grooves 11 and protrusions 12 can be formed in the second region 8 and between two adjacent metal wirings 6 on the second lower surface 132 of the transparent refraction layer facing the color filter substrate 1. That is, the grooves 11 and the protrusions 12 are formed by the plurality of insulation layers 13 which constitute the transparent refraction layer in a superposition manner According to the present embodiment, a quantity of the grooves 11 and the protrusions 12 is not defined. According to the present embodiment, the grooves 11 and the protrusions 12 are arranged so that the surface 31 of the array substrate 3 (i.e., a surface of the transparent refraction layer) facing the color filter substrate 1 is non-flat in the second region 8 and the aforesaid non-flat surface 10 can be formed.

It should be noted that, according to the present embodiment, the transparent refraction layer cannot be arranged superposed with the metal wiring 6 so as to avoid poor conductivity thereof.

According to the present embodiment, an inherent structure of the array substrate 3 does not need to be changed. The non-flat surface 10 as stated in embodiment 1 can be formed through only adding a manufacturing procedure of the insulation layer 13. It can be seen that, according to the present embodiment, the inherent structure of the array substrate and a pattern of a photomask used during the manufacturing procedure do not need to be changed, and the transparent refraction layer with a non-flat surface 10 can be formed through only adding a simply manufacturing procedure. Therefore, a manufacturing efficiency of a liquid crystal display product can be improved.

Embodiment 4

According to the present embodiment, a structure of an active area of a liquid crystal display panel is optimized.

According to the present embodiment, a color filter substrate and an array substrate are adhered to each other through a sealant. The sealant is coated on a non-active area of the surface of the array substrate facing the color filter substrate and a non-active area of a surface 101 of the color filter substrate facing the array substrate.

Figure 15:
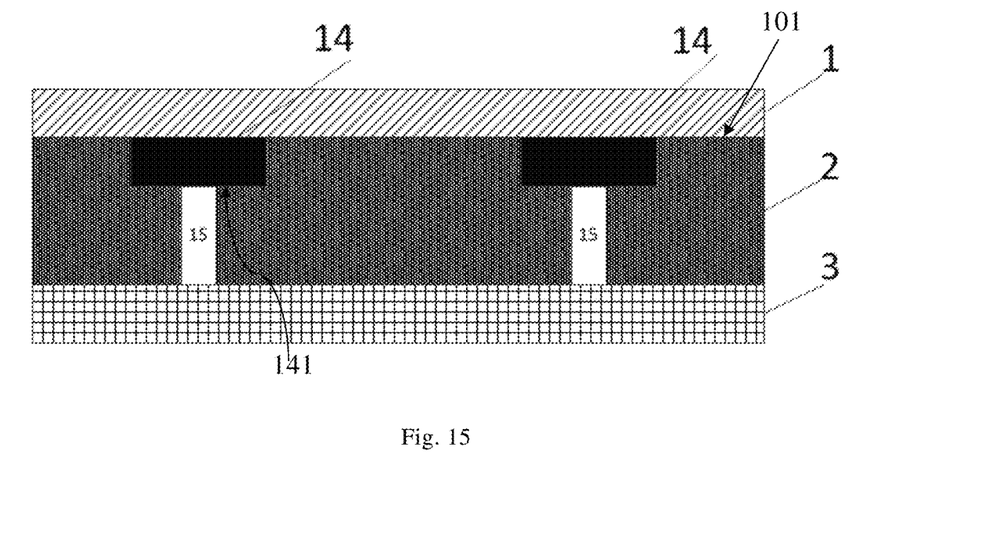
FIG. 15 is a sectional view of an active area of a liquid crystal display panel according to one embodiment of the present disclosure.

FIG. 15 is a sectional view of an active area of a liquid crystal display panel according to one embodiment of the present disclosure. As shown in FIG. 15, the sealant (not shown in FIG. 15) is also coated on a surface 141 of a black matrix 14 of the color filter substrate 1 facing the array substrate 3. In particular, the sealant that is coated on the surface of the black matrix 14 facing the array substrate 3 is doped with an interstitial 15.

Here, due to the interstitial 15 arranged therein, not only a thickness of a liquid crystal cell can be maintained, but also a positional deviation between the array substrate 3 and the color filter substrate 1 can be avoided when the liquid crystal cell is formed. In this manner, crosstalk and light leakage phenomena resulted from the positional deviation thereof can be avoided, and a display efficiency of a liquid crystal display product can be improved.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A liquid crystal display panel, comprising a color filter substrate, an array substrate, and a liquid crystal layer that is arranged between the color filter substrate and the array substrate,
    wherein the array substrate is divided into an active area and a non-active area, and the non-active area comprises a first region where a plurality of metal wirings of the array substrate is arranged and a second region where no metal wiring is arranged; and
    the array substrate comprises a transparent refraction layer that is formed next to a metal layer where the metal wiring is arranged; the metal layer comprises a first lower surface disposed close to the color filter substrate, and a first upper surface opposite to the first lower surface;
    wherein the transparent refraction layer is an insulation layer that is formed next to the metal layer where the metal wiring is arranged; the transparent refraction layer comprises a second lower surface disposed close to the color filter substrate, and a second upper surface opposite to the second lower surface; the first lower surface is flush with the second lower surface, and the first upper surface is flush with the second upper surface;
    the second lower surface is provided with grooves and/or protrusions in the second region and between two adjacent metal wirings, such that a surface of the array substrate facing the color filter substrate is not a planar surface in the second region.

2. The liquid crystal display panel according to claim 1, wherein the insulation layer is made of silicon nitride or silicon oxide.

3. The liquid crystal display panel according to claim 2,
    wherein the color filter substrate and the array substrate are adhered to each other through a sealant;
    wherein the sealant is coated on the surface of the array substrate facing the color filter substrate in the non-active area, a surface of the color filter substrate facing the array substrate in the non-active area, and a surface of a black matrix of the color filter substrate facing the array substrate; and
    wherein the sealant that is coated on the surface of the black matrix facing the array substrate is doped with an interstitial.

4. The liquid crystal display panel according to claim 1,
    wherein the color filter substrate and the array substrate are adhered to each other through a sealant;
    wherein the sealant is coated on the surface of the array substrate facing the color filter substrate in the non-active area, a surface of the color filter substrate facing the array substrate in the non-active area, and a surface of a black matrix of the color filter substrate facing the array substrate; and
    wherein the sealant that is coated on the surface of the black matrix facing the array substrate is doped with an interstitial.

5. The liquid crystal display panel according to claim 1, wherein the first region is non-continuous.

6. The liquid crystal display panel according to claim 1, wherein the second region is non-continuous.

7. The liquid crystal display panel according to claim 1, wherein the first region is non-continuous.

8. The liquid crystal display panel according to claim 1, wherein the second region is non-continuous.

9. A liquid crystal display panel, comprising a color filter substrate, an array substrate, and a liquid crystal layer that is arranged between the color filter substrate and the array substrate,
    wherein the array substrate is divided into an active area and a non-active area, and the non-active area comprises a first region where a plurality of metal wirings of the array substrate is arranged and a second region where no metal wiring is arranged; and
    the array substrate comprises a transparent refraction layer that is formed next to a metal layer where the metal wiring is arranged; the metal layer comprises a first lower surface disposed close to the color filter substrate, and a first upper surface opposite to the first lower surface;
    wherein the transparent refraction layer comprises a plurality of insulation layers that are formed next to the metal layer where the metal wiring is arranged; the transparent refraction layer comprises a second lower surface disposed close to the color filter substrate, and a second upper surface opposite to the second lower surface; the first lower surface is flush with the second lower surface, and the first upper surface is flush with the second upper surface;
    the second lower surface is provided with grooves and/or protrusions in the second region and between two adjacent metal wirings, such that a surface of the array substrate facing the color filter substrate is not a planar surface in the second region; wherein the grooves and/or protrusions are formed by the plurality of insulation layers in a superposition manner.

10. The liquid crystal display panel according to claim 9, wherein the insulation layers are made of silicon nitride or silicon oxide.

11. The liquid crystal display panel according to claim 10,
    wherein the color filter substrate and the array substrate are adhered to each other through a sealant;
    wherein the sealant is coated on the surface of the array substrate facing the color filter substrate in the non-active area, a surface of the color filter substrate facing the array substrate in the non-active area, and a surface of a black matrix of the color filter substrate facing the array substrate; and wherein the sealant that is coated on the surface of the black matrix facing the array substrate is doped with an interstitial.

12. The liquid crystal display panel according to claim 9, wherein the color filter substrate and the array substrate are adhered to each other through a sealant;
   wherein the sealant is coated on the surface of the array substrate facing the color filter substrate in the non-active area, a surface of the color filter substrate facing the array substrate in the non-active area, and a surface of a black matrix of the color filter substrate facing the array substrate; and
   wherein the sealant that is coated on the surface of the black matrix facing the array substrate is doped with an interstitial.

* * * * *